United States Patent
Wei

(10) Patent No.: US 10,162,421 B2
(45) Date of Patent: Dec. 25, 2018

(54) ACTION RECOGNITION METHOD AND ACTION RECOGNITION APPARATUS

(71) Applicant: Beijing Zhigu Rui Tuo Tech Co., Ltd., Beijing (CN)

(72) Inventor: Na Wei, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 0 days.

(21) Appl. No.: 15/277,454

(22) Filed: Sep. 27, 2016

(65) Prior Publication Data

US 2017/0115739 A1    Apr. 27, 2017

(30) Foreign Application Priority Data

Oct. 22, 2015   (CN) .......................... 2015 1 0691536

(51) Int. Cl.
*G06F 3/01*    (2006.01)

(52) U.S. Cl.
CPC ................... *G06F 3/017* (2013.01)

(58) Field of Classification Search
CPC ........ G06F 3/017; G06F 3/0346; G06F 3/013; G06F 1/163; G06F 3/011; G06F 3/016
See application file for complete search history.

(56) References Cited

U.S. PATENT DOCUMENTS

| | | | | |
|---|---|---|---|---|
| 2012/0224827 A1* | 9/2012 | Tano | ...................... | G07C 5/008 386/227 |
| 2014/0278220 A1* | 9/2014 | Yuen | ...................... | G01B 21/16 702/150 |
| 2015/0261315 A1* | 9/2015 | Alameh | ................... | G06F 3/03 345/156 |
| 2016/0081572 A1* | 3/2016 | Hong | .................. | A61B 5/0404 600/301 |
| 2017/0068393 A1* | 3/2017 | Viswanathan | ........ | G06F 3/0416 |
| 2017/0115738 A1* | 4/2017 | Wei | .......................... | G06F 3/017 |

* cited by examiner

*Primary Examiner* — Olga Merkoulova
(74) *Attorney, Agent, or Firm* — Sheppard Mullin Richter & Hampton LLP

(57) ABSTRACT

Embodiments of this application disclose an action recognition method and an action recognition apparatus. The method comprises: detecting a motion of at least one body position of a user by using at least one first-type sensor; in response to that a motion amplitude of the at least one body position does not exceed a preset threshold, activating at least one second-type sensor; and recognizing an action of the at least one body position of the user based on at least the detection result of the at least one second-type sensor. In the method and the apparatus of the embodiments of this application, different types of sensors can be selectively activated based on a motion amplitude, and relatively good action recognition precision and effects can be achieved by means of cooperation between various sensors.

31 Claims, 5 Drawing Sheets

ACTION RECOGNITION METHOD AND ACTION RECOGNITION APPARATUS

TECHNICAL FIELD

This application relates to the field of intelligent terminal technologies, and in particular, to an action recognition method and an action recognition apparatus.

BACKGROUND

Advance in technologies facilitates occurrence of smaller and stronger computing devices. For example, various portable personal computing devices exist currently, and such devices are relatively small, relatively light and easy to be carried by a user, for example, a telephone, a personal digital assistant (PDA), a tablet computer, and various wearable devices (for example, a smart watch, a smart band, and smart glasses). In addition to possessing a wireless communications function, this type of devices further have functions such as multimedia playing, network browsing, photographing and medical treatment and check. Therefore, to implement interaction between a user and such devices, many such devices comprise multiple apparatuses of other types incorporated into the devices, for example, a camera, a gyroscope, a proximity sensor (Proximity Sensor), a radar, and a global positioning system (Global Positioning System, GPS) sensor.

SUMMARY

In view of this, an objective of embodiments of this application is to provide an action recognition solution combined with various sensors.

To achieve the foregoing objective, according to a first aspect of the embodiments of this application, an action recognition method is provided, wherein the method comprises:

detecting a motion of at least one body position of a user by using at least one first-type sensor;

in response to that a motion amplitude of the at least one body position does not exceed a preset threshold, activating at least one second-type sensor; and recognizing an action of the at least one body position of the user based on at least the detection result of the at least one second-type sensor.

According to a second aspect of the embodiments of this application, an action recognition method is provided, wherein the method comprises:

detecting a motion of at least one body position of a user by using at least one first-type sensor and at least one second-type sensor;

in response to that a motion amplitude of the at least one body position exceeds a preset threshold, deactivating the at least one second-type sensor; and recognizing an action of the at least one body position of the user based on at least the detection result of the at least one first-type sensor.

According to a third aspect of this application, an action recognition apparatus is provided, wherein the apparatus comprises:

a first detection module, configured to detect a motion of at least one body position of a user by using at least one first-type sensor;

a first control module, configured to: in response to that a motion amplitude of the at least one body position does not exceed a preset threshold, activate at least one second-type sensor; and a second control module, configured to generate a control command based on at least a detection result of the at least one second-type sensor.

According to a fourth aspect of this application, an action recognition apparatus is provided, wherein the apparatus comprises:

a second detection module, configured to detect a motion of at least one body position of a user by using at least one first-type sensor and at least one second-type sensor;

a third control module, configured to: in response to that a motion amplitude of the at least one body position exceeds a preset threshold, deactivating the at least one second-type sensor; and a fourth control module, configured to generate a control command based on at least a detection result of the at least one first-type sensor.

According to a fifth aspect of this application, a computing device is provided, wherein the device comprises: any action recognition apparatus provided in the foregoing third aspect and/or any action recognition apparatus provided in the foregoing fourth aspect, and further comprises the at least one first-type sensor and/or the at least one second-type sensor.

According to a sixth aspect of this application, an action recognition apparatus is provided, wherein the apparatus comprises:

a memory, configured to store an instruction; and a processor, configured to execute the instruction stored in the memory, wherein the instruction enables the processor to perform the following steps:

detecting a motion of at least one body position of a user by using at least one first-type sensor;

in response to that a motion amplitude of the at least one body position does not exceed a preset threshold, activating at least one second-type sensor; and generating a control command based on at least a detection result of the at least one second-type sensor.

According to a seventh aspect of this application, an action recognition apparatus is provided, wherein the apparatus comprises:

a memory, configured to store an instruction; and a processor, configured to execute the instruction stored in the memory, wherein the instruction enables the processor to perform the following steps:

detecting a motion of at least one body position of a user by using at least one first-type sensor and at least one second-type sensor;

in response to that a motion amplitude of the at least one body position exceeds a preset threshold, deactivating the at least one second-type sensor; and generating a control command based on at least a detection result of the at least one first-type sensor.

In the method and the apparatus of the embodiments of this application, use of different types of sensors can be selectively activated based on a motion amplitude, and relatively good action recognition precision and effects can be achieved by means of cooperation between various sensors.

DETAILED DESCRIPTION

The detailed description of the present invention is further described in detail hereinafter in connection with accompanying drawings and embodiments. The following embodiments are used to describe the present invention, but not used to limit the scope of the present invention.

It can be understood by a person skilled in the art that the terms such as "first" and "second" in this application are only used to differentiate different devices, modules or parameters, and the terms neither represent any specific technical meaning, nor represent an inevitable logic sequence between the steps, the devices, or the modules.

Figure 1:
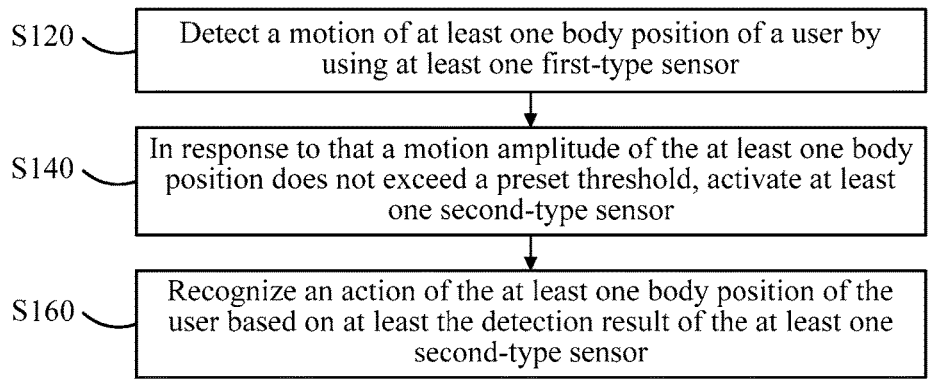
FIG. 1 is an exemplary flowchart of an action recognition method of a first embodiment of this application.

FIG. 1 is an exemplary flowchart of an action recognition method of a first embodiment of this application. The method of this embodiment is applicable to a scenario in which one or more first-type sensors are being configured or are to be configured to perform action recognition on at least one body position of a user, and the first-type sensor may be any type of sensor that can be configured to detect a motion of the at least one body position of the user, and may belong to an apparatus for implementing the method of this embodiment. As shown in FIG. 1, the method comprises:

S120. Detect a motion of at least one body position of a user by using at least one first-type sensor.

In a possible implementation manner, one or more first-type sensors may be disposed at any one or more locations of a to-be-controlled device that do not affect normal use of the device. The at least one body position may mean any appropriate position on the body of the user, for example, a hand, a leg, an eye, or any other position.

S140. In response to that a motion amplitude of the at least one body position does not exceed a preset threshold, activate at least one second-type sensor.

In technical solutions of the embodiments of this application, various available sensors are selectively activated just based on this and according to a motion amplitude of at least one body position of the user. In the method of this embodiment, the motion amplitude may mean a displacement of the at least one body position of the user relative to a reference within a preset detection time. The preset detection time may be any one appropriate period of time between start and end of a motion, and for example, an apparatus for implementing the method of this embodiment or a device itself that implements control based on an action recognized by the method of this embodiment may be the reference. For example, the motion amplitude may be a displacement of a hand portion of the user relative to a display screen of the to-be-controlled device within the preset detection time.

Moreover, based on effects that can be achieved by means of cooperation between various sensors and that the method of this embodiment expects to achieve, a type of a sensor that is to be activated and cooperates with the first-type sensor is selected, that is, the at least one second-type sensor, and the corresponding preset threshold used to activate the second-type sensor is determined.

Different types of sensors can detect a motion amplitude in different capabilities and precisions. For example, the user implements control by performing a swipe or slide action on a 2D plane with the entire hand portion of the user. Such action may be detected by using such sensors as an infrared proximity sensor (IR Proximity Sensor), an image sensor (Image sensor), an ultrasonic sensor, and a radar, but precisions are different from each other. For example, compared with the ultrasonic sensor, the detection precision of the image sensor may be higher; and compared with the image sensor, the detection precision of the radar is higher. For such relatively subtle actions as pinching and twisting of fingers, the infrared proximity sensor or the image sensor (because of light rays and the like) even possibly cannot detect the actions or has a relatively low detection precision, while the radar may track the most subtle action of the hand portion of the user. Therefore, in a possible implementation manner, in the method of this embodiment, the second-type sensor may be activated to achieve a relatively high action recognition precision. In such implementation manner, preferably, the second-type sensor has a higher detection precision for a motion amplitude not exceeding the preset threshold than that of the first-type sensor for the motion amplitude not exceeding the preset threshold. The first-type sensor has a higher detection precision for a motion amplitude exceeding the preset threshold than that of the second-type sensor for the motion amplitude exceeding the preset threshold.

Moreover, different types of sensors may have different costs, power consumption and the like. For example, the corresponding cost and possible power consumption of a sensor having a relatively high precision are larger. Therefore, in another possible implementation manner, in the method of this embodiment, to achieve an objective of balance between an action recognition precision and device power consumption, the second-type sensor is selectively activated. Particularly, in a case in which the sensors belong to, for example, a wearable device, an endurance capability of such device is an important factor affecting user experience, and power consumption of various sensors comprised in the wearable device becomes an important consideration factor. In such case, the second-type sensor is a sensor having higher power consumption than that of the first-type sensor. Therefore, in addition to the foregoing precision consideration, in the method of this embodiment, the second-type sensor is selectively activated based on detection precisions for an action of different motion amplitudes, thereby achieving balance between an action recognition precision and power consumption as much as possible.

S160. Recognize an action of the at least one body position of the user based on at least the detection result of the at least one second-type sensor.

It should be noted that, the preset threshold may be determined based on an optimal effect that needs to be achieved by means of cooperation between various sensors. For example, the preset threshold may be so set that: when the second-type sensor is activated based on the preset threshold, use of the first-type sensor and the second-type sensor not only can satisfy an action recognition precision that control needs to, but also can achieve the lowest power consumption, that is, achieve balance between an action recognition precision and power consumption. Moreover, the preset threshold may be dynamically changed in consideration of a current power level of the apparatus for implementing the method of this embodiment. For another example, the preset threshold may be only so set that: action recognition of all subtle extents can be implemented based on different detection capabilities of the sensors. For example, the preset threshold is set to a minimum motion amplitude that the proximity sensor can detect, and once the minimum motion amplitude is reached, use of the radar may be activated.

To sum up, in the method of this embodiment, use of different types of sensors can be selectively activated based on a motion amplitude, so as to have relatively good recognition efficiency and effects.

In a possible implementation manner, in the method of this embodiment, after the second-type sensor is activated, the first-type sensor may not be used again, thereby further reducing power consumption. In such implementation manner, the method of this embodiment further comprises:

S150. In response to that the at least one second-type sensor is activated, deactivate the at least one first-type sensor. In such implementation manner, an action of the at least one body position of the user may be recognized based on only the detection result of the at least one second-type sensor.

In another possible implementation manner, in the method of this embodiment, action recognition may be performed with reference to the detection result of the first-type sensor and the second-type sensor. In such implementation manner, step S160 may further comprise:

S162. Recognize an action of the at least one body position based on at least a detection result of the at least one first-type sensor and the at least one second-type sensor.

Specifically, in a possible implementation manner, the quantity of second-type sensors that may be used may be more than one. For example, when gesture control is implemented, a hand of the user may be located at different locations relative to the to-be-controlled device, multiple second-type sensors may be disposed at different locations of the to-be-controlled device, a motion of the hand portion of the user may be detected as long as one or more second-type sensors at corresponding locations are activated without need of activating all the second-type sensors. In such case, the detection result of the first-type sensor may be used to activate the second-type sensor, but is not directly used for action recognition. Step S162 may further comprise:

S1622. Determine the activated at least one second-type sensor based on at least a detection result of the at least one first-type sensor. For example, a group of (one or more) first-type sensors may be disposed corresponding to a group of (one or more) second-type sensors. If a group of first-type sensors detect a motion of at least one body position of the user, when the second-type sensor is activated, a group of second-type sensors corresponding to the group of first-type sensors are activated.

S1624. Recognize an action of the at least one body position based on at least the detection result of the at least one second-type sensor, that is, perform action recognition based on only the detection result of the second-type sensor.

Optionally, step S162 may further comprise:

S1622'. Determine a configuration parameter of the activated at least one second-type sensor based on at least a detection result of the at least one first-type sensor.

The detection result of the first-type sensor may be used to determine and/or adjust the configuration parameter of the activated at least one second-type sensor, so as to achieve the best detection performance of the second-type sensor. Based on the type of the used sensor, the configuration parameter may comprise but not limited to: a transmit power, a transmit power, and a transmission frequency. For example, when the second-type sensor comprises a radar, the transmission direction, the transmission frequency and the like of the radar may be adjusted based on a location, of the at least one body position of the user, detected by the first-type sensor.

S1624'. Recognize an action of the at least one body position based on at least the detection result of the at least one second-type sensor, that is, perform action recognition based on only the detection result of the second-type sensor.

Moreover, the method of this embodiment may be applied to various control scenarios applicable to a computing devices that is controlled based on a gesture of the user, and various sensors used in technical solutions of the embodiments of this application belong to the to-be-controlled computing device itself, and such device comprises but not limited to: a mobile phone, a tablet computer, a vehicle-mounted device, a wearable device (for example, a smart watch, and a smart band), or any other computing device that may be controlled based on a gesture of the user. With development of action-recognition, for example, gesture-control based control technologies, and with reduction of the volume of a computing device, increasingly subtle control actions occur. In such case, the method of this embodiment further comprises:

S180. Perform matching between the recognized action and at least one preset action, and generate a control command based on a matching result.

The at least one preset action may be an already set action that can be acquired and that matches different control commands, for example, stored locally in the apparatus for implementing the method of this embodiment, or locally in the to-be-controlled device.

In still another possible implementation manner, the at least one preset action may be classified as multiple different motion modes. For example, a gesture is divided into multiple motion modes such as slide, swipe, twisting, pinching, rotation, and grasping. First-round matching may be performed based on the detection result of the first-type sensor, to determine matching motion modes; then, second-round matching is performed based on the detection result of the activated second-type sensor among the determined motion modes, so as to improve a matching speed. In such case, step S160 may further comprise:

S162'. Determine a motion mode of the at least one body position based on at least a detection result of the at least one first-type sensor.

S164'. Recognize an action of the user based on at least the detection result of the at least one second-type sensor.

In such implementation manner, step S180 may comprise:

S182. Perform matching between the recognized action and the at least one preset action based on at least the determined motion mode, and generate a control command based on a matching result.

After the at least one second-type sensor is activated, in the method of this embodiment, some or all of the activated second-type sensors may be deactivated at any time based on a change of the motion amplitude, so as to satisfy requirements of the detection precision and power consumption. In such case, the method of this embodiment may further comprise:

S190. In response to that the motion amplitude exceeds the preset threshold, deactivate the at least one second-type sensor.

To sum up, the method of this embodiment provides a solution in which action recognition of various sensors is implemented based on a motion amplitude, and then control is implemented.

It should be understood that, as used in this text, a "radar" is a detection apparatus that detects existence of objects, their speeds and motion directions and a distance from them to the radar by using an electromagnetic wave and particularly a radio wave. A transmitted wave rebounded (that is, reflected) from an object may be detected by the radar, a distance from the radar to the object may be determined according to a time difference between the transmitted wave and a reflected wave, whether the object moves toward or away from the radar can be detected by detecting a Doppler frequency shift, and a direction of the object may be determined by means of beamforming.

It should be further noted that, in the technical solution of this embodiment of this application, an action of at least one body position of the user may be recognized based on a detection result of a sensor and by using any appropriate technology in this field, which is not used herein as a limitation to technical solutions of the embodiments of this application.

Figure 2:
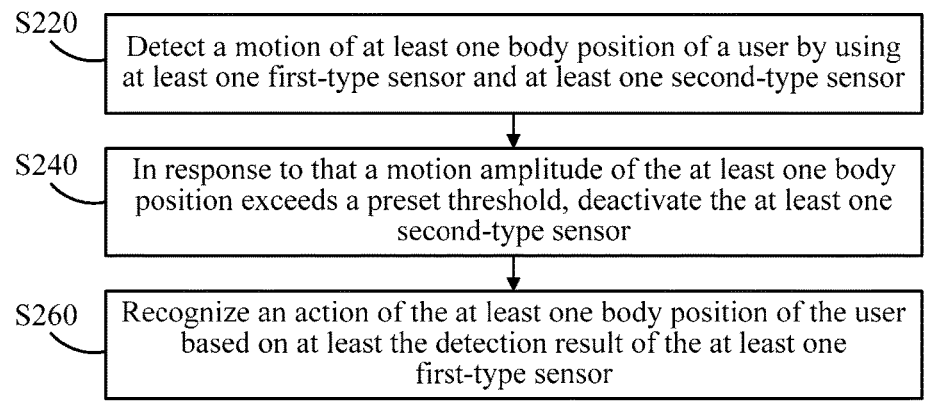
FIG. 2 is an exemplary flowchart of an action recognition method of a second embodiment of this application.

FIG. 2 is an exemplary flowchart of an action recognition method of a second embodiment of this application. The method of this embodiment is applicable to a scenario in which one or more first-type sensors and one or more second-type sensors are being configured or are to be configured to recognize an action of at least one body position of a user. As shown in FIG. 2, the method comprises:

S220. Detect a motion of at least one body position of a user by using at least one first-type sensor and at least one second-type sensor.

In a possible implementation manner, the one or more first-type sensors and the one or more second-type sensors may be disposed at any one or more locations of a to-be-controlled device that do not affect normal use of the device. The at least one body position may mean any appropriate position on the body of the user, for example, a hand, a leg, an eye, or any other position.

S240. In response to that a motion amplitude of the at least one body position exceeds a preset threshold, deactivate the at least one second-type sensor.

In the method of this embodiment, the motion amplitude means a displacement of the at least one body position of the user relative to a reference within a preset detection time. The preset detection time may be any one appropriate period of time between start and end of a motion, and for example, an apparatus for implementing the method of this embodiment or a to-be-controlled device itself that implements control based on an action recognized by the method of this embodiment may be the reference. For example, the motion amplitude may be a displacement of a hand portion of the user relative to a display screen of the to-be-controlled device within the preset detection time.

As described with reference to FIG. 1, in the method of this embodiment, the preset threshold may be set based on an optimal recognition effect that needs to be achieved by means of cooperation between the first-type sensor and the second-type sensor. Different types of sensors can detect a motion amplitude in different capabilities and precisions. Different types of sensors may have different costs, power consumption and the like. For example, the cost and possible power consumption corresponding to a sensor having a relatively high precision are larger. Therefore, in a possible implementation manner, in the method of this embodiment, the second-type sensor and the first-type sensor cooperate to achieve an objective of balance between an action recognition precision and device power consumption. Particularly, in a case in which the sensors belong to the to-be-controlled device, an endurance capability of, for example, a wearable device is an important factor affecting user experience, and power consumption of various sensors comprised in the wearable device becomes an important consideration factor. In such case, in the method of this embodiment, when an action of at least one position of the user may be precisely detected by only using a sensor having a relatively low precision (power consumption), that is, a motion amplitude does not exceed the preset threshold, the at least one second-type sensor is deactivated, thereby achieving balance between an action recognition precision and power consumption as much as possible.

S260. Recognize an action of the at least one body position of the user based on at least the detection result of the at least one first-type sensor.

It should be noted that, the preset threshold may be so set that: when the at least one second-type sensor is deactivated based on the preset threshold, use of the first-type sensor not only can satisfy an action recognition precision that control needs to, but also can achieve the lowest power consumption, that is, achieve balance between an action recognition precision and power consumption. Moreover, the preset threshold may be further dynamically changed in consideration of a current power level of the apparatus for implementing the method of this embodiment. For another example, the preset threshold may be only so set that: action recognition of all subtle extents can be implemented based on different detection capabilities of the sensors. For example, the preset threshold is set to a minimum motion amplitude that the proximity sensor can detect, and once the minimum motion amplitude is reached, use of the radar may be deactivated.

To sum up, in the method of this embodiment, use of different types of sensors whose power consumption is relatively high can be selectively deactivated based on a motion amplitude and according to different recognition objectives that need to be achieved, and balance between a detection precision and power consumption can be achieved.

After the second-type sensor is deactivated, action recognition may be implemented by using the detection result of the first-type sensor. That is, in step S262, an action of the user may be recognized based on at least the detection result of the at least one first-type sensor.

As described with reference to FIG. 1, when the detection result of the at least one first-type sensor is insufficient to support action recognition on at least one body position of the user, in the method of this embodiment, the previously deactivated at least one second-type sensor still needs to be activated in time. In a possible implementation manner, the method of this embodiment further comprises:

S280. In response to that a motion amplitude of the at least one body position of the user does not exceed the preset threshold, activate the at least one second-type sensor.

In such case, step S260 may further comprise:

S262. Recognize an action of the at least one body position based on at least a detection result of the at least one first-type sensor and the at least one second-type sensor.

Specifically, in a possible implementation manner, the quantity of second-type sensors that may be used may be more than one. For example, when gesture control is implemented, a hand of the user may be located at different locations relative to the to-be-controlled device, multiple second-type sensors may be disposed at different locations of the to-be-controlled device, a motion of the hand portion of the user may be detected as long as one or more second-type sensors at corresponding locations are activated without need of activating all the second-type sensors. In such case, the detection result of the first-type sensor may be used to activate the second-type sensor, but is not directly used for action recognition. Step S262 may further comprise:

S2622. Determine the activated at least one second-type sensor based on at least a detection result of the at least one first-type sensor. For example, a group of (one or more) first-type sensors may be disposed corresponding to a group of (one or more) second-type sensors. If a group of first-type sensors detect a motion of at least one body position of the user, when the second-type sensor is activated, a group of second-type sensors corresponding to the group of first-type sensors are activated.

S2624. Recognize an action of the at least one body position based on at least the detection result of the at least one second-type sensor, that is, perform action recognition based on only the detection result of the second-type sensor.

Optionally, step S262 may further comprise:

S2622'. Determine a configuration parameter of the activated at least one second-type sensor based on at least a detection result of the at least one first-type sensor.

The detection result of the first-type sensor may be used to determine and/or adjust the configuration parameter of the activated at least one second-type sensor, so as to achieve the best detection performance of the second-type sensor. Based on the type of the used sensor, the configuration parameter may comprise but not limited to: a transmit power, a transmit power, and a transmission frequency. For example, when the second-type sensor comprises a radar, the transmission direction, the transmission frequency and the like of the radar may be adjusted based on a location, of the at least one body position of the user, detected by the first-type sensor.

S2624'. Recognize an action of the at least one body position based on at least the detection result of the at least one second-type sensor, that is, perform action recognition based on only the detection result of the second-type sensor.

Moreover, the method of this embodiment may be applied to various control scenarios applicable to a computing devices that is controlled based on a gesture of the user, and various sensors used in technical solutions of the embodiments of this application belong to the to-be-controlled computing device itself, and such device comprises but not limited to: a mobile phone, a tablet computer, a vehicle-mounted device, a wearable device (for example, a smart watch, and a smart band), or any other computing device that may be controlled based on a gesture of the user. With development of action-recognition, for example, gesture-control based control technologies, and with reduction of the volume of a computing device, increasingly subtle control actions occur. In such case, the method of this embodiment further comprises:

S290. Recognize an action of the at least one body position of the user based on at least a detection result of the at least one first-type sensor and the at least one second-type sensor.

The at least one preset action may be an already set action that can be acquired and that matches different control commands, for example, stored locally in the apparatus for implementing the method of this embodiment, or locally in the to-be-controlled device.

In an implementation manner of recognizing an action of the at least one body position of the user based on at least a detection result of the at least one first-type sensor and the at least one second-type sensor, optionally, the at least one preset action may be classified as multiple different motion modes. For example, a gesture is divided into multiple motion modes such as slide, swipe, twisting, pinching, rotation, and grasping. First-round matching may be performed based on the detection result of the first-type sensor, to determine matching motion modes; then, second-round matching is performed based on the detection result of the activated second-type sensor among the determined motion modes, so as to improve a matching speed. In such case, step S262 may further comprise:

S262". Determine a motion mode of the at least one body position based on at least a detection result of the at least one first-type sensor.

S264". Recognize an action of the user based on at least the detection result of the at least one second-type sensor.

In such case, step S290 may further comprise:

S292. Perform matching between the recognized action and the at least one preset action based on at least the determined motion mode, and generate a control command based on a matching result.

Moreover, to further reduce power consumption, after the at least one second-type sensor is activated again, the at least one first-type sensor may be deactivated, that is, the method further comprises:

S282. In response to that the at least one second-type sensor is activated, deactivate the at least one first-type sensor.

To sum up, the method of this embodiment provides a solution in which action recognition of various sensors is implemented based on a motion amplitude, and then control is implemented.

Persons skilled in the art can understand that, in the foregoing methods of the specific implementation manners of this application, the value of the sequence number of each step does not indicate an execution order, and the execution order of the steps should be determined according to a function and an inherent logic thereof, and should not form any limit to the implementation process of the specific implementation manners of this application.

Moreover, an embodiment of this application further provides a computer readable medium, comprising a computer readable instruction for performing the following operations when being executed: operations of performing the steps of the method in the implementation manner shown in FIG. 1.

Moreover, an embodiment of this application further provides a computer readable medium, comprising a computer readable instruction for performing the following operations when being executed: operations of performing the steps of the method in the implementation manner shown in FIG. 2.

Figure 3A:
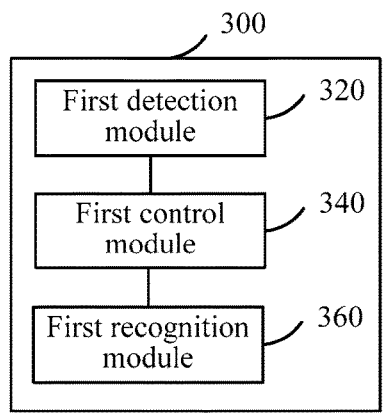
FIG. 3 (a) to FIG. 3 (c) are multiple exemplary structural block diagrams of an action recognition apparatus of a first embodiment of this application.
Figure 3B:
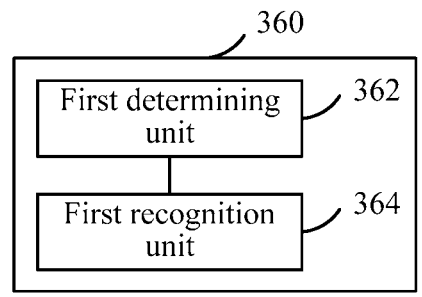
Figure 3C:
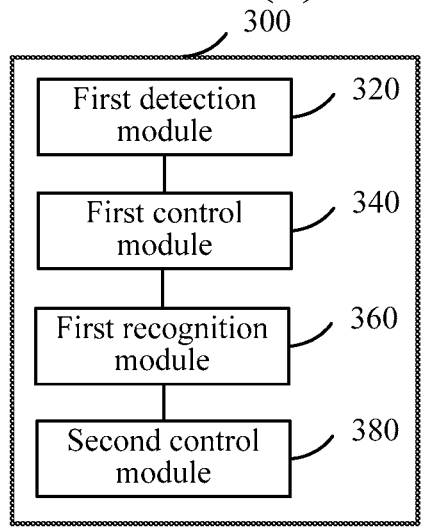

FIG. 3 (a) is an exemplary structural block diagram of an action recognition apparatus of a first embodiment of this application. A first-type sensor may belong to the apparatus of this embodiment or belong to the to-be-controlled computing device, and the first-type sensor may be any type of sensor that can be configured to detect at least one body position of a user. As shown in FIG. 3 (a), the action recognition apparatus 300 of this embodiment comprises: a first detection module 320, a first control module 340, and a first recognition module 360.

The first detection module 320 is configured to detect a motion of at least one body position of a user by using at least one first-type sensor.

In a possible implementation manner, one or more first-type sensors may be disposed at any one or more locations of a to-be-controlled device that do not affect normal use of the device. The at least one body position may mean any appropriate position on the body of the user, for example, a hand, a leg, an eye, or any other position.

The first control module 340 is configured to: in response to that a motion amplitude of the at least one body position does not exceed a preset threshold, activate at least one second-type sensor.

In technical solutions of the embodiments of this application, various available sensors are selectively activated just based on this and according to a motion amplitude of at least one body position of the user. In the apparatus of this embodiment, the motion amplitude may mean a displacement of the at least one body position of the user relative to a reference within a preset detection time. The preset detection time may be any one appropriate period of time between start and end of a motion, and for example, the apparatus of this embodiment or a device itself that implements control based on an action recognized by the apparatus of this embodiment may be the reference. For example, the motion amplitude may be a displacement of a hand portion of the user relative to a display screen of the to-be-controlled device within the preset detection time.

Moreover, based on effects that can be achieved by means of cooperation between various sensors and that the apparatus of this embodiment expects to achieve, a type of a sensor that is to be activated and cooperates with the first-type sensor is selected, that is, the at least one second-type sensor, and the corresponding preset threshold used to activate the second-type sensor is determined.

Different types of sensors can detect a motion amplitude in different capabilities and precisions. For example, the user implements control by performing a swipe or slide action on a 2D plane with the entire hand portion of the user. Such action may be detected by using such sensors as an infrared proximity sensor (IR Proximity Sensor), an image sensor (Image sensor), an ultrasonic sensor, and a radar, but precisions are different from each other. For example, compared with the ultrasonic sensor, the detection precision of the image sensor may be higher; and compared with the image sensor, the detection precision of the radar is higher. For such relatively subtle actions as pinching and twisting of fingers, the infrared proximity sensor or the image sensor (because of light rays and the like) even possibly cannot detect the actions or has a relatively low detection precision, while the radar may track the most subtle action of the hand portion of the user. Therefore, in a possible implementation manner, the apparatus of this embodiment may activate the second-type sensor to achieve a relatively high action recognition precision. In such implementation manner, preferably, the second-type sensor has a higher detection precision for a motion amplitude not exceeding the preset threshold than that of the first-type sensor for the motion amplitude not exceeding the preset threshold. The first-type sensor has a higher detection precision for a motion amplitude exceeding the preset threshold than that of the second-type sensor for the motion amplitude exceeding the preset threshold.

Moreover, different types of sensors may have different costs, power consumption and the like. For example, the corresponding cost and possible power consumption of a sensor having a relatively high precision are larger. Therefore, in another possible implementation manner, in the method of this embodiment, to achieve an objective of balance between an action recognition precision and device power consumption, the second-type sensor is selectively activated. Particularly, in a case in which the sensors belong to, for example, a wearable device, an endurance capability of such device is an important factor affecting user experience, and power consumption of various sensors comprised in the wearable device becomes an important consideration factor. In such case, the second-type sensor is a sensor having higher power consumption than that of the first-type sensor. Therefore, in addition to the foregoing precision consideration, in the method of this embodiment, the second-type sensor is selectively activated based on detection precisions for an action of different motion amplitudes, thereby achieving balance between an action recognition precision and power consumption as much as possible.

The first recognition module 360 is configured to recognize an action of the at least one body position of the user based on at least the detection result of the at least one second-type sensor.

It should be noted that, the preset threshold may be determined based on an optimal effect that needs to be achieved by means of cooperation between various sensors. For example, the preset threshold may be so set that: when the second-type sensor is activated based on the preset threshold, use of the first-type sensor and the second-type sensor not only can satisfy an action recognition precision that control needs to, but also can achieve the lowest power consumption, that is, achieve balance between an action recognition precision and power consumption. Moreover, the preset threshold may be dynamically changed in consideration of a current power level of the apparatus for implementing the method of this embodiment. For another example, the preset threshold may be only so set that: action recognition of all subtle extents can be implemented based on different detection capabilities of the sensors. For example, the preset threshold is set to a minimum motion amplitude that the proximity sensor can detect, and once the minimum motion amplitude is reached, use of the radar may be activated.

To sum up, the apparatus of this embodiment can selectively activate use of different types of sensors based on a motion amplitude, so as to have relatively good recognition efficiency and effects.

In a possible implementation manner, after activating the second-type sensor, the apparatus of this embodiment may not use the first-type sensor again, thereby further reducing power consumption. In such implementation manner, the first control module 340 is further configured to: in response to that the at least one second-type sensor is activated, deactivate the at least one first-type sensor. In such implementation manner, an action of the at least one body position of the user may be recognized based on only the detection result of the at least one second-type sensor.

In another possible implementation manner, the apparatus of this embodiment may perform action recognition with reference to the detection result of the first-type sensor and the second-type sensor. In such implementation manner, the first recognition module 360 may be configured to recognize an action of the at least one body position based on at least a detection result of the at least one first-type sensor and the at least one second-type sensor.

Specifically, as shown in FIG. 3 (*b*), the first recognition module 360 may further comprise a first determining unit 362 and a first recognition unit 364.

In a possible implementation manner, the quantity of second-type sensors that may be used may be more than one. For example, when gesture control is implemented, a hand of the user may be located at different locations relative to the to-be-controlled device, multiple second-type sensors may be disposed at different locations of the to-be-controlled device, a motion of the hand portion of the user may be detected as long as one or more second-type sensors at corresponding locations are activated without need of activating all the second-type sensors. In such case, the detection result of the first-type sensor may be used to activate the second-type sensor, but is not directly used for action recognition. The first determining unit 362 is configured to determine the activated at least one second-type sensor based on at least a detection result of the at least one first-type sensor. For example, a group of (one or more) first-type sensors may be disposed corresponding to a group of (one or more) second-type sensors. If a group of first-type sensors detect a motion of at least one body position of the user, when the second-type sensor is activated, a group of second-type sensors corresponding to the group of first-type sensors are activated.

The first recognition unit 364 may be configured to recognize an action of the at least one body position based on at least the detection result of the at least one second-type sensor, that is, perform action recognition based on only the detection result of the second-type sensor.

In another possible implementation manner, the first determining unit 362 may be further configured to determine a configuration parameter of the activated at least one second-type sensor based on at least a detection result of the at least one first-type sensor.

The detection result of the first-type sensor may be used to determine and/or adjust the configuration parameter of the activated at least one second-type sensor, so as to achieve the best detection performance of the second-type sensor. Based on the type of the used sensor, the configuration parameter may comprise but not limited to: a transmit power, a transmit power, and a transmission frequency. For example, when the second-type sensor comprises a radar, the transmission direction, the transmission frequency and the like of the radar may be adjusted based on a location, of the at least one body position of the user, detected by the first-type sensor.

The first recognition unit 364 may be further configured to recognize an action of the at least one body position based on at least the detection result of the at least one second-type sensor, that is, perform action recognition based on only the detection result of the second-type sensor.

Moreover, the apparatus of this embodiment may be applied to various control scenarios applicable to a computing devices that is controlled based on a gesture of the user, and various sensors used in technical solutions of the embodiments of this application belong to the to-be-controlled computing device itself, and such device comprises but not limited to: a mobile phone, a tablet computer, a vehicle-mounted device, a wearable device (for example, a smart watch, and a smart band), or any other computing device that may be controlled based on a gesture of the user. With development of action-recognition, for example, gesture-control based control technologies, and with reduction of the volume of a computing device, increasingly subtle control actions occur. In such case, as shown in FIG. 3 (*c*), the apparatus 300 of this embodiment may further comprise:

a second control module 380, configured to perform matching between the recognized action and at least one preset action, and generate a control command based on a matching result.

The at least one preset action may be an already set action that can be acquired and that matches different control commands, for example, stored locally in the apparatus of this embodiment, or locally in the to-be-controlled device.

In still another possible implementation manner, the at least one preset action may be classified as multiple different motion modes. For example, a gesture is divided into multiple motion modes such as slide, swipe, twisting, pinching, rotation, and grasping. First-round matching may be performed based on the detection result of the first-type sensor, to determine matching motion modes; then, second-round matching is performed based on the detection result of the activated second-type sensor among the determined motion modes, so as to improve a matching speed. In such case, the first determining unit 362 may be configured to determine a motion mode of the at least one body position based on at least a detection result of the at least one first-type sensor.

The first recognition unit 364 may be configured to recognize an action of the user based on at least the detection result of the at least one second-type sensor.

In such implementation manner, the second control module 380 may be configured to perform matching between the recognized action and the at least one preset action based on at least the determined motion mode, and generate a control command based on a matching result.

After the at least one second-type sensor is activated, the apparatus of this embodiment may deactivate some or all of the activated second-type sensors at any time based on a change of the motion amplitude, so as to satisfy requirements of the detection precision and power consumption. In such case, the first control module 340 may be further configured to: in response to that the motion amplitude exceeds the preset threshold, deactivate the at least one second-type sensor.

To sum up, the apparatus of this embodiment provides a solution in which action recognition of various sensors is implemented based on a motion amplitude, and then control is implemented.

It should be further noted that, in the technical solution of this embodiment of this application, an action of at least one body position of the user may be recognized based on a detection result of a sensor and by using any appropriate technology in this field, which is not used herein as a limitation to technical solutions of the embodiments of this application.

Figure 4A:
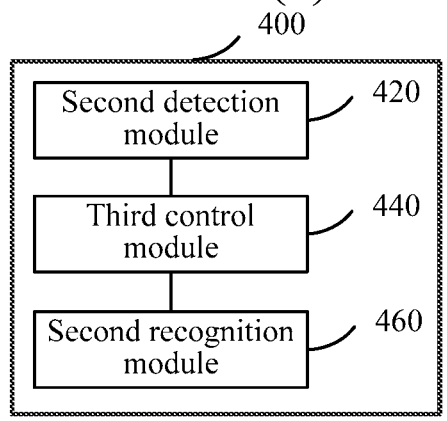
FIG. 4 (a) to FIG. 4 (c) are multiple exemplary structural block diagrams of an action recognition apparatus of a second embodiment of this application.
Figure 4B:
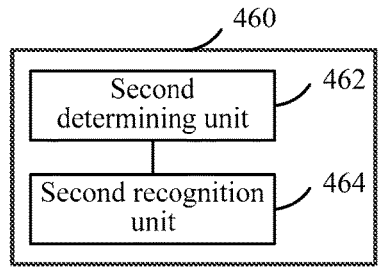
Figure 4C:
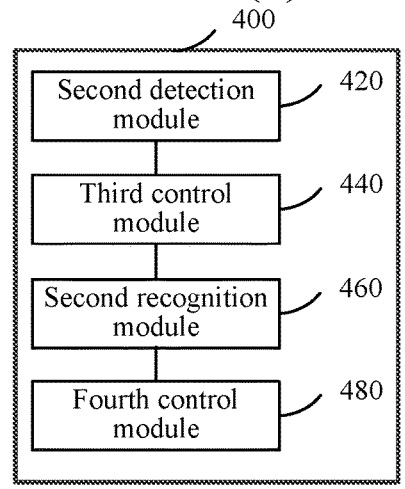

FIG. 4 (*a*) is an exemplary structural block diagram of an action recognition apparatus of a second embodiment of this application. A first-type sensor and a second-type sensor may belong to the apparatus of this embodiment or belong to the to-be-controlled computing device. As shown in FIG. 4 (*a*), the apparatus 400 comprises: a second detection module 420, a third control module 440, and a second recognition module 460.

The second detection module 420 is configured to detect a motion of at least one body position of a user by using at least one first-type sensor and at least one second-type sensor.

In a possible implementation manner, the one or more first-type sensors and the one or more second-type sensors may be disposed at any one or more locations of a to-be-controlled device that do not affect normal use of the device. The at least one body position may mean any appropriate position on the body of the user, for example, a hand, a leg, an eye, or any other position.

The third control module 440 is configured to: in response to that a motion amplitude of the at least one body position exceeds a preset threshold, deactivating the at least one second-type sensor.

In the apparatus of this embodiment, the motion amplitude means a displacement of the at least one body position of the user relative to a reference within a preset detection time. The preset detection time may be any one appropriate period of time between start and end of a motion, and for example, the apparatus of this embodiment or a to-be-controlled device itself that implements control based on an action recognized by the method of this embodiment may be the reference. For example, the motion amplitude may be a displacement of a hand portion of the user relative to a display screen of the to-be-controlled device within the preset detection time.

As described with reference to FIG. 1, in the apparatus of this embodiment, the preset threshold may be set based on an optimal recognition effect that needs to be achieved by means of cooperation between the first-type sensor and the second-type sensor. Different types of sensors can detect a motion amplitude in different capabilities and precisions. Different types of sensors may have different costs, power consumption and the like. For example, the cost and possible power consumption corresponding to a sensor having a relatively high precision are larger. Therefore, in a possible implementation manner, the second-type sensor and the first-type sensor cooperate to achieve an objective of balance between an action recognition precision and device power consumption. Particularly, in a case in which the sensors belong to the to-be-controlled device, an endurance capability of, for example, a wearable device is an important factor affecting user experience, and power consumption of various sensors comprised in the wearable device becomes an important consideration factor. In such case, when an action of at least one position of the user may be precisely detected by only using a sensor having a relatively low precision (power consumption), that is, a motion amplitude does not exceed the preset threshold, the apparatus of this embodiment deactivates the at least one second-type sensor, thereby achieving balance between an action recognition precision and power consumption as much as possible.

The second recognition module 460 is configured to recognize an action of the at least one body position of the user based on at least the detection result of the at least one first-type sensor.

It should be noted that, the preset threshold may be so set that: when the at least one second-type sensor is deactivated based on the preset threshold, use of the first-type sensor not only can satisfy an action recognition precision that control needs to, but also can achieve the lowest power consumption, that is, achieve balance between an action recognition precision and power consumption. Moreover, the preset threshold may be further dynamically changed in consideration of a current power level of the apparatus for implementing the method of this embodiment. For another example, the preset threshold may be only so set that: action recognition of all subtle extents can be implemented based on different detection capabilities of the sensors. For example, the preset threshold is set to a minimum motion amplitude that the proximity sensor can detect, and once the minimum motion amplitude is reached, use of the radar may be deactivated.

To sum up, the apparatus of this embodiment can selectively deactivate use of different types of sensors whose power consumption is relatively high based on a motion amplitude and according to different recognition objectives that need to be achieved, and balance between a detection precision and power consumption can be achieved.

After the second-type sensor is deactivated, action recognition may be implemented by using the detection result of the first-type sensor. That is, the second recognition module 460 may be configured to recognize an action of the user based on at least the detection result of the at least one first-type sensor.

As described with reference to FIG. 1, when the detection result of the at least one first-type sensor is insufficient to support action recognition on at least one body position of the user, the apparatus of this embodiment still needs to activate the previously deactivated at least one second-type sensor in time. In a possible implementation manner, the third control module 440 may be further configured to: in response to that a motion amplitude of the at least one body position of the user does not exceed the preset threshold, activate the at least one second-type sensor.

In such case, the second recognition module 460 may be configured to recognize an action of the at least one body position based on at least a detection result of the at least one first-type sensor and the at least one second-type sensor.

Specifically, as shown in FIG. 4 (*b*), the second recognition module 460 may further comprise a second determining unit 462 and a second recognition unit 464. Moreover, in a possible implementation manner, the quantity of second-type sensors that may be used may be more than one. For example, when gesture control is implemented, a hand of the user may be located at different locations relative to the to-be-controlled device, multiple second-type sensors may be disposed at different locations of the to-be-controlled device, a motion of the hand portion of the user may be detected as long as one or more second-type sensors at corresponding locations are activated without need of activating all the second-type sensors. In such case, the detection result of the first-type sensor may be used to activate the second-type sensor, but is not directly used for action recognition. The second determining unit 462 may be configured to determine the activated at least one second-type sensor based on at least a detection result of the at least one first-type sensor. For example, a group of (one or more) first-type sensors may be disposed corresponding to a group of (one or more) second-type sensors. If a group of first-type sensors detect a motion of at least one body position of the user, when the second-type sensor is activated, a group of second-type sensors corresponding to the group of first-type sensors are activated.

The second recognition unit 464 may be configured to recognize an action of the at least one body position based on at least the detection result of the at least one second-type sensor, that is, perform action recognition based on only the detection result of the second-type sensor.

Optionally, the second determining unit 462 may be further configured to determine a configuration parameter of the activated at least one second-type sensor based on at least a detection result of the at least one first-type sensor.

The detection result of the first-type sensor may be used to determine and/or adjust the configuration parameter of the activated at least one second-type sensor, so as to achieve the best detection performance of the second-type sensor. Based on the type of the used sensor, the configuration parameter may comprise but not limited to: a transmit power, a transmit power, and a transmission frequency. For example, when the second-type sensor comprises a radar, the transmission direction, the transmission frequency and the like of the radar may be adjusted based on a location, of the at least one body position of the user, detected by the first-type sensor.

The second recognition unit 464 may be further configured to recognize an action of the at least one body position based on at least the detection result of the at least one second-type sensor, that is, perform action recognition based on only the detection result of the second-type sensor.

Moreover, the method of this embodiment may be applied to various control scenarios applicable to a computing devices that is controlled based on a gesture of the user, and various sensors used in technical solutions of the embodiments of this application belong to the to-be-controlled computing device itself, and such device comprises but not limited to: a mobile phone, a tablet computer, a vehicle-mounted device, a wearable device (for example, a smart watch, and a smart band), or any other computing device that may be controlled based on a gesture of the user. With development of action-recognition, for example, gesture-control based control technologies, and with reduction of the volume of a computing device, increasingly subtle control actions occur. In such case, as shown in FIG. 4 (c), the apparatus 400 of this embodiment may further comprise:

a fourth control module 480, configured to recognize an action of the at least one body position of the user based on at least a detection result of the at least one first-type sensor and the at least one second-type sensor.

The at least one preset action may be an already set action that can be acquired and that matches different control commands, for example, stored locally in the apparatus of this embodiment, or locally in the to-be-controlled device.

In an implementation manner in which the second recognition module 460 recognizes an action of the at least one body position of the user based on at least a detection result of the at least one first-type sensor and the at least one second-type sensor, optionally, the at least one preset action may be classified as multiple different motion modes. For example, a gesture is divided into multiple motion modes such as slide, swipe, twisting, pinching, rotation, and grasping. First-round matching may be performed based on the detection result of the first-type sensor, to determine matching motion modes; then, second-round matching is performed based on the detection result of the activated second-type sensor among the determined motion modes, so as to improve a matching speed. In such case, the second determining unit 462 may be configured to determine a motion mode of the at least one body position based on at least a detection result of the at least one first-type sensor.

The second recognition unit 464 may be configured to recognize an action of the user based on at least the detection result of the at least one second-type sensor.

In such case, the fourth control module 480 may be configured to perform matching between the recognized action and the at least one preset action based on at least the determined motion mode, and generate a control command based on a matching result.

Moreover, to further reduce power consumption, after the at least one second-type sensor is activated again, the at least one first-type sensor may be deactivated, that is, the third control module 440 may be further configured to: in response to that the at least one second-type sensor is activated, deactivate the at least one first-type sensor.

To sum up, the apparatus of this embodiment provides a solution in which action recognition of various sensors is implemented based on a motion amplitude, and then control is implemented.

Figure 5:
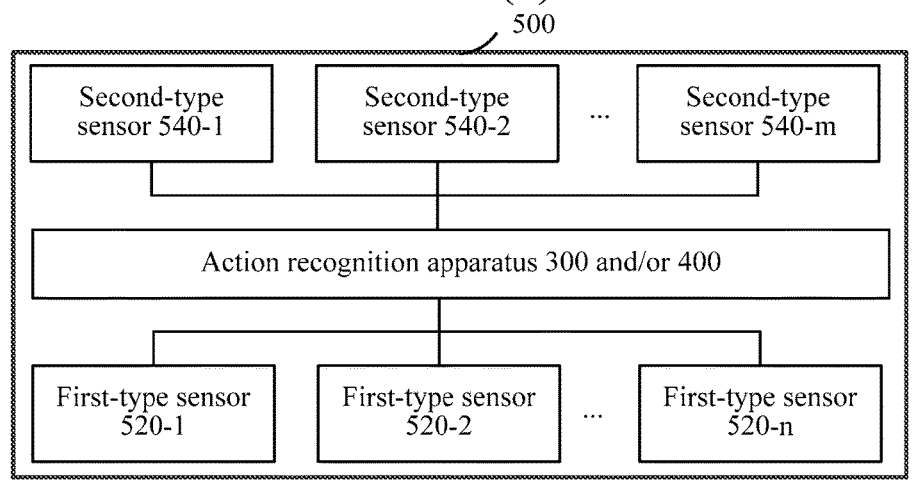
FIG. 5 is an exemplary structural block diagram of a computing device of an embodiment of this application.

As shown in FIG. 5, FIG. 5 is an exemplary structural block diagram of a computing device provided by this application. The apparatus 500 may comprise the action recognition apparatus 300 shown in FIG. 3 (a) to FIG. 3 (c) and/or the action recognition apparatus 400 shown in FIG. 4 (a) to FIG. 4 (c). Moreover, the apparatus 500 further comprises at least one first-type sensor 520-1, 520-2, . . . , 502-n, and at least one second-type sensor 540-1, 540-2, . . . , 504-m, wherein n and m are both natural numbers greater than or equal to 1, and n and m may be the same or different.

Figure 6:
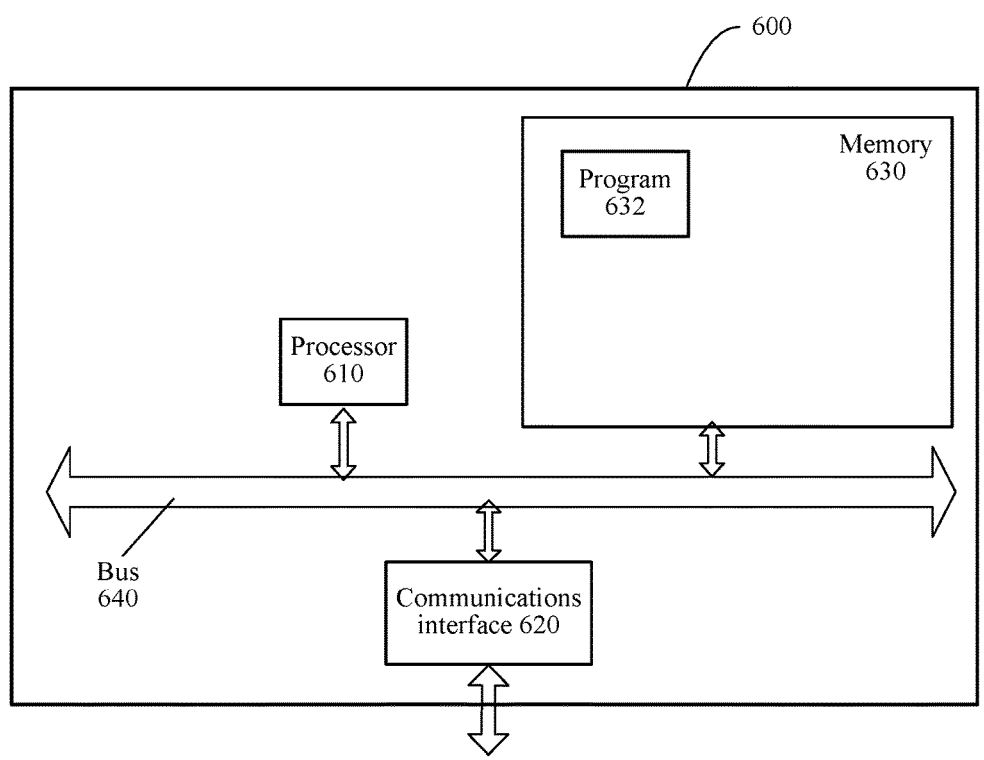
FIG. 6 is another exemplary structural block diagram of an action recognition apparatus of a first embodiment of this application.

FIG. 6 is still another exemplary schematic structural diagram of an action recognition apparatus provided by a first embodiment of this application. Specific embodiments of this application do not limit specific implementation of the action recognition apparatus. As shown in FIG. 6, the action recognition apparatus 600 may comprise:

a processor (processor) 610, a communications interface (Communications Interface) 620, a memory (memory) 630, and a communication bus 640.

The processor 610, the communications interface 620, and the memory 630 communicate with each other through the communication bus 640.

The communications interface 620 is configured to communicate with a network element such as a client.

The processor 610 is configured to execute a program 632, and may specifically execute related steps in the method embodiments in FIG. 1.

Specifically, the program 632 may comprise program code, wherein the program code comprises a computer operation instruction.

The processor 610 may be a central processing unit CPU, or an application specific integrated circuit ASIC (Application Specific Integrated Circuit), or one or more integrated circuits that are configured to implement the embodiment of this application.

The memory 630 is configured to store the program 632. The memory 630 may comprise a high-speed RAM memory, and may further comprise a non-volatile memory (non-volatile memory), for example, at least one disk memory. The program 632 may be specifically configured to enable the action recognition apparatus 600 to perform the following steps:

detecting a motion of at least one body position of a user by using at least one first-type sensor;

in response to that a motion amplitude of the at least one body position does not exceed a preset threshold, activating at least one second-type sensor; and recognizing an action of the at least one body position of the user based on at least the detection result of the at least one second-type sensor.

For specific implementation of steps in the program 632, reference may be made to corresponding description of related steps and units in the foregoing embodiment, which is not described here. It may be clearly understood by a person skilled in the art that, for the purpose of convenient and brief description, for a detailed working process of the foregoing device and module, reference may be made to description about a corresponding process in the foregoing method embodiments, and details are not described herein again.

It may be clearly understood by a person skilled in the art that, for the purpose of convenient and brief description, for a detailed working process of the foregoing device and module, reference may be made to corresponding description in the foregoing apparatus embodiments, and details are not described herein again.

Figure 7:
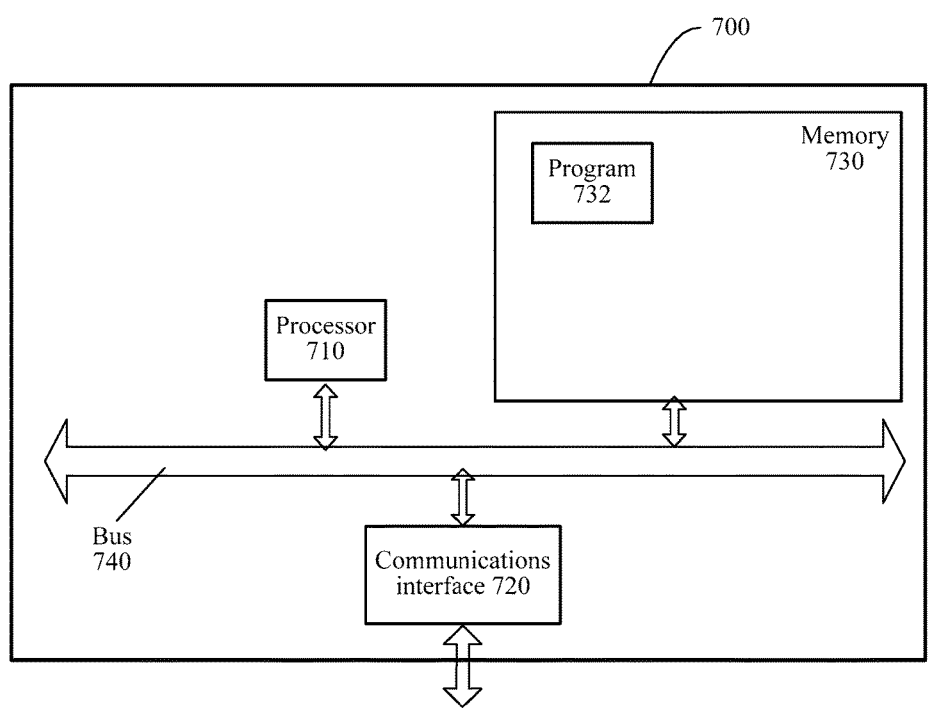
FIG. 7 is another exemplary structural block diagram of an action recognition apparatus of a second embodiment of this application.

FIG. 7 is still another exemplary schematic structural diagram of an action recognition apparatus provided by a second embodiment of this application. Specific embodiments of this application do not limit specific implementation of the action recognition apparatus. As shown in FIG. 7, the action recognition apparatus 700 may comprise:

a processor (processor) 710, a communications interface (Communications Interface) 720, a memory (memory) 730, and a communication bus 740.

The processor 710, the communications interface 720, and the memory 730 communicate with each other through the communication bus 740.

The communications interface 720 is configured to communicate with a network element such as a client.

The processor 710 is configured to execute a program 732, and may specifically execute related steps in the method embodiments in FIG. 2.

Specifically, the program 732 may comprise program code, wherein the program code comprises a computer operation instruction.

The processor 710 may be a central processing unit CPU, or an application specific integrated circuit ASIC (Application Specific Integrated Circuit), or one or more integrated circuits that are configured to implement the embodiment of this application.

The memory 730 is configured to store the program 732. The memory 730 may comprise a high-speed RAM memory, and may further comprise a non-volatile memory (non-volatile memory), for example, at least one disk memory. The program 732 may be specifically configured to enable the action recognition apparatus 700 to perform the following steps:

detecting a motion of at least one body position of a user by using at least one first-type sensor and at least one second-type sensor;

in response to that a motion amplitude of the at least one body position exceeds a preset threshold, deactivating the at least one second-type sensor; and recognizing an action of the at least one body position of the user based on at least the detection result of the at least one first-type sensor.

For specific implementation of steps in the program 732, reference may be made to corresponding description of related steps and units in the foregoing embodiment, which is not described here. It may be clearly understood by a person skilled in the art that, for the purpose of convenient and brief description, for a detailed working process of the foregoing device and module, reference may be made to description about a corresponding process in the foregoing method embodiments, and details are not described herein again.

It may be clearly understood by a person skilled in the art that, for the purpose of convenient and brief description, for a detailed working process of the foregoing device and module, reference may be made to corresponding description in the foregoing apparatus embodiments, and details are not described herein again.

Although the present invention is described herein in the general context of program modules that execute in conjunction with an application program that runs on an operating system on a computer system, a person skilled in the art will recognize that the present invention may also be implemented in combination with other types of program modules. Generally, program modules comprise routines, programs, components, data structures and other types of structures that perform particular tasks or implement particular abstract data types. It can be understood by a person skilled in the art that the present invention described herein may be practiced with other computer system configurations, comprising handheld devices, multiprocessor systems, microprocessor-based or programmable consumer electronics, minicomputers, mainframe computers, and so on, and may also be practiced in distributed computing environments wherein tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When the functions are implemented in a form of a software functional module and sold or used as an independent product, the functions may be stored in a computer-readable storage medium. Based on such an understanding, the technical solutions of this application essentially, or the part contributing to the prior art, or all or some of the technical solutions may be implemented in a form of a software product. The computer software product is stored in a storage medium and comprises several instructions for instructing a computer device (which may be a personal computer, a server, a network device, or the like) to perform all or some of the steps of the methods described in the embodiments of this application. The foregoing computer-readable storage medium comprises physically volatile and non-volatile media, and removable and non-removable media implemented by using any method or technology used for storing information such as a computer readable instruction, a data structure, a program module or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The foregoing implementation manners are merely intended for describing the present invention rather than limiting the present invention. A person of ordinary skill in the art should understand that modifications and variations may still be made without departing from the spirit and scope of the present invention. Therefore, all equivalent technical solutions shall fall within the scope of the present invention, and the patent protection scope of the present invention shall be subject to the claims.

What is claimed is:

1. An action recognition method, wherein the method comprises:

detecting a motion of at least one body position of a user by using at least one first-type sensor;

in response to that a motion amplitude of the at least one body position does not exceed a preset threshold, activating at least one second-type sensor, wherein the second-type sensor has a higher detection precision for a motion amplitude not exceeding the preset threshold than that of the first-type sensor for the motion amplitude not exceeding the preset threshold; and recognizing an action of the at least one body position of the user based on at least a detection result of the at least one second-type sensor, wherein the recognizing an action of the at least one body position of the user comprises:

recognizing an action of the at least one body position of the user based on at least a detection result of the at least one first-type sensor and the at least one second-type sensor, and wherein the recognizing an action of the at least one body position comprises:

determining and/or adjusting a configuration parameter of the activated at least one second-type sensor based on at least a detection result of the at least one first-type sensor; and recognizing an action of the at least one body position based on at least the detection result of the at least one second-type sensor.

2. The method of claim 1, wherein the method further comprises:

in response to that the at least one second-type sensor is activated, deactivating the at least one first-type sensor.

3. The method of claim 1, wherein the recognizing an action of the at least one body position comprises:

determining the activated at least one second-type sensor based on at least a detection result of the at least one first-type sensor; and recognizing an action of the at least one body position based on at least the detection result of the at least one second-type sensor.

4. The method of claim 1, wherein the at least one second-type sensor comprises a radar, and the configuration parameter comprises at least one of the following: a transmit power, a transmission direction, a transmission frequency, and a beamforming parameter of the radar.

5. The method of claim 1, wherein the method further comprises:

performing matching between the recognized action and at least one preset action, and generating a control command based on a matching result.

6. The method of claim 1, wherein the recognizing an action of the at least one body position comprises:

determining a motion mode of the at least one body position based on at least a detection result of the at least one first-type sensor; and recognizing an action of the user based on at least the detection result of the at least one second-type sensor; and the method further comprises:

performing matching between the recognized action and the at least one preset action based on at least the determined motion mode, and generating a control command based on a matching result.

7. The method of claim 1, wherein the method further comprises:

in response to that the motion amplitude exceeds the preset threshold, deactivating the at least one second-type sensor.

8. The method of claim 1, wherein the first-type sensor has a higher detection precision for a motion amplitude exceeding the preset threshold than that of the second-type sensor for the motion amplitude exceeding the preset threshold.

9. The method of claim 8, wherein power consumption of the second-type sensor is higher than that of the first-type sensor.

10. An action recognition method, wherein the method comprises:

detecting a motion of at least one body position of a user by using at least one first-type sensor and at least one second-type sensor;

in response to that a motion amplitude of the at least one body position exceeds a preset threshold, deactivating the at least one second-type sensor, wherein the first-type sensor has a higher detection precision for a motion amplitude exceeding the preset threshold than that of the second-type sensor for the motion amplitude exceeding the preset threshold; and recognizing an action of the at least one body position of the user based on at least a detection result of the at least one first-type sensor, wherein the method further comprises:

in response to that a motion amplitude of the at least one body position of the user does not exceed the preset threshold, activating the at least one second-type sensor, wherein the recognizing an action of the at least one body position of the user comprises:

recognizing an action of the at least one body position of the user based on at least a detection result of the at least one first-type sensor and the at least one second-type sensor, and wherein the recognizing an action of the at least one body position comprises:

determining and/or adjusting a configuration parameter of the activated at least one second-type sensor based on at least a detection result of the at least one first-type sensor; and recognizing an action of the at least one body position based on at least the detection result of the at least one second-type sensor.

11. The method of claim 10, wherein the method further comprises:

in response to that the at least one second-type sensor is activated, deactivating the at least one first-type sensor.

12. The method of claim 10, wherein the recognizing an action of the at least one body position of the user comprises:

determining the activated at least one second-type sensor based on at least a detection result of the at least one first-type sensor; and recognizing an action of the at least one body position based on at least the detection result of the at least one second-type sensor.

13. The method of claim 12, wherein the at least one second-type sensor comprises a radar, and the configuration parameter comprises at least one of the following: a transmit power, a transmission direction, a transmission frequency, and a beamforming parameter of the radar.

14. The method of claim 10, wherein the method further comprises:

performing matching between the recognized action and at least one preset action, and generating a control command based on a matching result.

15. The method of claim 10, wherein the recognizing an action of the at least one body position comprises:

determining a motion mode of the at least one body position based on at least a detection result of the at least one first-type sensor; and recognizing an action of the user based on at least the detection result of the at least one second-type sensor; and the method further comprises:

performing matching between the recognized action and the at least one preset action based on at least the determined motion mode, and generating a control command based on a matching result.

16. The method of claim 10, wherein the second-type sensor has a higher detection precision for a motion amplitude not exceeding the preset threshold than that of the first-type sensor for the motion amplitude not exceeding the preset threshold.

17. The method of claim 16, wherein power consumption of the second-type sensor is higher than that of the first-type sensor.

18. An action recognition apparatus, wherein the apparatus comprises:
a first detection module, configured to detect a motion of at least one body position of a user by using at least one first-type sensor;
a first control module, configured to: in response to that a motion amplitude of the at least one body position does not exceed a preset threshold, activate at least one second-type sensor, wherein the second-type sensor has a higher detection precision for a motion amplitude not exceeding the preset threshold than that of the first-type sensor for the motion amplitude not exceeding the preset threshold; and
a first recognition module, configured to recognize an action of the at least one body position of the user based on at least a detection result of the at least one second-type sensor,
wherein the first recognition module is configured to recognize an action of the at least one body position of the user based on at least a detection result of the at least one first-type sensor and the at least one second-type sensor, and
wherein the first recognition module comprises:
a first determining unit, configured to determine and/or adjust a configuration parameter of the activated at least one second-type sensor based on at least a detection result of the at least one first-type sensor; and
a first recognition unit, configured to recognize an action of the at least one body position based on at least the detection result of the at least one second-type sensor.

19. The apparatus of claim 18, wherein the first control module is further configured to: in response to that the at least one second-type sensor is activated, deactivate the at least one first-type sensor.

20. The apparatus of claim 18, wherein the first recognition module comprises:
a first determining unit, configured to determine the activated at least one second-type sensor based on at least a detection result of the at least one first-type sensor; and
a first recognition unit, configured to recognize an action of the at least one body position based on at least the detection result of the at least one second-type sensor.

21. The apparatus of claim 18, wherein the apparatus further comprises:
a second control module, configured to perform matching between the recognized action and at least one preset action, and generate a control command based on a matching result.

22. The apparatus of claim 18, wherein the first recognition module comprises:
a first determining unit, configured to determine a motion mode of the at least one body position based on at least a detection result of the at least one first-type sensor; and
a first recognition unit, configured to recognize an action of the user based on at least the detection result of the at least one second-type sensor; and
the apparatus further comprises:
a second control module, configured to perform matching between the recognized action and the at least one preset action based on at least the determined motion mode, and generate a control command based on a matching result.

23. The apparatus of claim 18, wherein the first control module is further configured to: in response to that the motion amplitude exceeds the preset threshold, deactivate the at least one second-type sensor.

24. An action recognition apparatus, wherein the apparatus comprises:
a second detection module, configured to detect a motion of at least one body position of a user by using at least one first-type sensor and at least one second-type sensor;
a third control module, configured to: in response to that a motion amplitude of the at least one body position exceeds a preset threshold, deactivating the at least one second-type sensor, wherein the first-type sensor has a higher detection precision for a motion amplitude exceeding the preset threshold than that of the second-type sensor for the motion amplitude exceeding the preset threshold; and
a second recognition module, configured to recognize an action of the at least one body position of the user based on at least a detection result of the at least one first-type sensor,
wherein the third control module is further configured to: in response to that a motion amplitude of the at least one body position of the user does not exceed the preset threshold, activate the at least one second-type sensor,
wherein the second recognition module is configured to recognize an action of the at least one body position of the user based on at least a detection result of the at least one first-type sensor and the at least one second-type sensor, and
wherein the second recognition module comprises:
a second determining unit, configured to determine and/or adjust a configuration parameter of the activated at least one second-type sensor based on at least a detection result of the at least one first-type sensor; and
a second recognition unit, configured to recognize an action of the at least one body position based on at least the detection result of the at least one second-type sensor.

25. The apparatus of claim 24, wherein the third control module is further configured to: in response to that the at least one second-type sensor is activated, deactivate the at least one first-type sensor.

26. The apparatus of claim 24, wherein the second recognition module comprises:
a second determining unit, configured to determine the activated at least one second-type sensor based on at least a detection result of the at least one first-type sensor; and
a second recognition unit, configured to recognize an action of the at least one body position based on at least the detection result of the at least one second-type sensor.

27. The apparatus of claim 24, wherein the apparatus further comprises:
a fourth control module, configured to perform matching between the recognized action and at least one preset action, and generate a control command based on a matching result.

28. The apparatus of claim 24, wherein the second recognition module comprises:

a second determining unit, configured to determine a motion mode of the at least one body position based on at least a detection result of the at least one first-type sensor; and a second recognition unit, configured to recognize an action of the user based on at least the detection result of the at least one second-type sensor; and the apparatus further comprises:

a fourth control module, configured to perform matching between the recognized action and the at least one preset action based on at least the determined motion mode, and generate a control command based on a matching result.

29. A computing device, wherein the device comprises a first action recognition apparatus and/or a second action recognition apparatus, and the device further comprises the at least one first-type sensor and/or the at least one second-type sensor, wherein, the first action recognition apparatus comprises:

a first detection module, configured to detect a motion of at least one body position of a user by using at least one first-type sensor;

a first control module, configured to: in response to that a motion amplitude of the at least one body position does not exceed a preset threshold, activate at least one second-type sensor, wherein the second-type sensor has a higher detection precision for a motion amplitude not exceeding the preset threshold than that of the first-type sensor for the motion amplitude not exceeding the preset threshold; and a first recognition module, configured to recognize an action of the at least one body position of the user based on at least a detection result of the at least one second-type sensor, wherein the first recognition module is configured to recognize an action of the at least one body position of the user based on at least a detection result of the at least one first-type sensor and the at least one second-type sensor, and wherein the first recognition module comprises:

a first determining unit, configured to determine and/or adjust a configuration parameter of the activated at least one second-type sensor based on at least a detection result of the at least one first-type sensor; and a first recognition unit, configured to recognize an action of the at least one body position based on at least the detection result of the at least one second-type sensor;

and wherein, the second action recognition apparatus comprises:

a second detection module, configured to detect a motion of at least one body position of a user by using at least one first-type sensor and at least one second-type sensor;

a third control module, configured to: in response to that a motion amplitude of the at least one body position exceeds a preset threshold, deactivating the at least one second-type sensor, wherein the first-type sensor has a higher detection precision for a motion amplitude exceeding the preset threshold than that of the second-type sensor for the motion amplitude exceeding the preset threshold; and a second recognition module, configured to recognize an action of the at least one body position of the user based on at least a detection result of the at least one first-type sensor, wherein the third control module is further configured to: in response to that a motion amplitude of the at least one body position of the user does not exceed the preset threshold, activate the at least one second-type sensor, wherein the second recognition module is configured to recognize an action of the at least one body position of the user based on at least a detection result of the at least one first-type sensor and the at least one second-type sensor, and wherein the second recognition module comprises:

a second determining unit, configured to determine and/or adjust a configuration parameter of the activated at least one second-type sensor based on at least a detection result of the at least one first-type sensor; and a second recognition unit, configured to recognize an action of the at least one body position based on at least the detection result of the at least one second-type sensor.

30. An action recognition apparatus, wherein the apparatus comprises:

a memory, configured to store an instruction; and a processor, configured to execute the instruction stored in the memory, wherein the instruction enables the processor to perform the following steps:

detecting a motion of at least one body position of a user by using at least one first-type sensor;

in response to that a motion amplitude of the at least one body position does not exceed a preset threshold, activating at least one second-type sensor, wherein the second-type sensor has a higher detection precision for a motion amplitude not exceeding the preset threshold than that of the first-type sensor for the motion amplitude not exceeding the preset threshold; and recognizing an action of the at least one body position of the user based on at least a detection result of the at least one second-type sensor, wherein the recognizing an action of the at least one body position of the user comprises:

recognizing an action of the at least one body position of the user based on at least a detection result of the at least one first-type sensor and the at least one second-type sensor, and wherein the recognizing an action of the at least one body position comprises:

determining and/or adjusting a configuration parameter of the activated at least one second-type sensor based on at least a detection result of the at least one first-type sensor; and recognizing an action of the at least one body position based on at least the detection result of the at least one second-type sensor.

31. An action recognition apparatus, wherein the apparatus comprises:

a memory, configured to store an instruction; and a processor, configured to execute the instruction stored in the memory, wherein the instruction enables the processor to perform the following steps:

detecting a motion of at least one body position of a user by using at least one first-type sensor and at least one second-type sensor;

in response to that a motion amplitude of the at least one body position exceeds a preset threshold, deactivating the at least one second-type sensor, wherein the first-type sensor has a higher detection precision for a motion amplitude exceeding the preset threshold than that of the second-type sensor for the motion amplitude exceeding the preset threshold; and recognizing an action of the at least one body position of the user based on at least a detection result of the at least one first-type sensor, wherein the method further comprises:

in response to that a motion amplitude of the at least one body position of the user does not exceed the preset threshold, activating the at least one second-type sensor, wherein the recognizing an action of the at least one body position of the user comprises:

recognizing an action of the at least one body position of the user based on at least a detection result of the at least one first-type sensor and the at least one second-type sensor, and wherein the recognizing an action of the at least one body position comprises:

determining and/or adjusting a configuration parameter of the activated at least one second-type sensor based on at least a detection result of the at least one first-type sensor; and recognizing an action of the at least one body position based on at least the detection result of the at least one second-type sensor.

* * * * *